(12) United States Patent
Hamamura et al.

(10) Patent No.: US 11,393,612 B2
(45) Date of Patent: Jul. 19, 2022

(54) GRAIN-ORIENTED ELECTRICAL STEEL SHEET

(71) Applicant: NIPPON STEEL CORPORATION, Tokyo (JP)

(72) Inventors: Hideyuki Hamamura, Tokyo (JP); Satoshi Arai, Tokyo (JP); Takashi Kataoka, Tokyo (JP); Shunsuke Okumura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 149 days.

(21) Appl. No.: 16/971,617

(22) PCT Filed: Feb. 26, 2019

(86) PCT No.: PCT/JP2019/007251
§ 371 (c)(1),
(2) Date: Aug. 20, 2020

(87) PCT Pub. No.: WO2019/164012
PCT Pub. Date: Aug. 29, 2019

(65) Prior Publication Data
US 2020/0381150 A1    Dec. 3, 2020

(30) Foreign Application Priority Data

Feb. 26, 2018   (JP) .............................. JP2018-032552

(51) Int. Cl.
*B23K 26/364* (2014.01)
*H01F 1/147* (2006.01)
(Continued)

(52) U.S. Cl.
CPC ........... *H01F 1/147* (2013.01); *B23K 26/364* (2015.10); *C21D 3/04* (2013.01); *C21D 6/008* (2013.01);
(Continued)

(58) Field of Classification Search
CPC .............. B23K 26/364; B23K 2101/18; B23K 2101/38; B23K 2103/04
(Continued)

(56) References Cited

U.S. PATENT DOCUMENTS

2013/0017408 A1   1/2013 Sakai et al.
2013/0129984 A1   5/2013 Omura et al.
(Continued)

FOREIGN PATENT DOCUMENTS

CA   2 987 379 A1   2/2017
EP   3 406 740 A1   11/2018
(Continued)

OTHER PUBLICATIONS

"Methods of measurement of the magnetic properties of magnetic steel sheet and strip by means of a single sheet tester", JIS C 2556, 2015, total 254 pages.
(Continued)

*Primary Examiner* — Humera N. Sheikh
*Assistant Examiner* — Katherine A Christy
(74) *Attorney, Agent, or Firm* — Birch, Stewart, Kolasch & Birch, LLP

(57) ABSTRACT

A grain-oriented electrical steel sheet according to the present embodiment is a grain-oriented electrical steel sheet having a groove formed on a surface, in which, in a cross section of the grain-oriented electrical steel sheet orthogonal to the groove, a KAM value is 0.1 or more and 3.0 or less in a region on a central side in a thickness direction of the grain-oriented electrical steel sheet with respect to the groove, the region being surrounded by a square having one side in contact with a groove bottom of the groove and having a length of 50 μm in each side.

4 Claims, 5 Drawing Sheets

(51) Int. Cl.
- *C21D 3/04* (2006.01)
- *C21D 6/00* (2006.01)
- *C21D 8/00* (2006.01)
- *C21D 8/12* (2006.01)
- *C21D 9/46* (2006.01)
- *C22C 38/02* (2006.01)
- *B23K 101/18* (2006.01)
- *B23K 103/04* (2006.01)
- *B23K 101/38* (2006.01)

(52) U.S. Cl.
CPC .......... *C21D 8/005* (2013.01); *C21D 8/1233* (2013.01); *C21D 8/1272* (2013.01); *C21D 8/1283* (2013.01); *C21D 9/46* (2013.01); *C22C 38/02* (2013.01); *B23K 2101/18* (2018.08); *B23K 2101/38* (2018.08); *B23K 2103/04* (2018.08)

(58) Field of Classification Search
USPC ........................................................ 428/600
See application file for complete search history.

(56) References Cited

U.S. PATENT DOCUMENTS

| | | |
|---|---|---|
| 2013/0160901 A1 | 6/2013 | Omura et al. |
| 2015/0059932 A1 | 3/2015 | Hirano et al. |
| 2017/0369960 A1 | 12/2017 | Kwon et al. |
| 2018/0036838 A1* | 2/2018 | Hamamura .......... C21D 8/1294 |

FOREIGN PATENT DOCUMENTS

| | | |
|---|---|---|
| JP | 5234222 B2 | 7/2013 |
| KR | 10-2017-0088246 A | 8/2017 |
| WO | WO 2011/125672 A1 | 10/2011 |
| WO | WO 2012/017690 A1 | 2/2012 |
| WO | WO 2012/032792 A1 | 3/2012 |
| WO | WO 2013/161863 A1 | 10/2013 |
| WO | WO 2016/105055 A1 | 6/2016 |
| WO | WO-2016171129 A1 * | 10/2016 .......... B23K 26/364 |

OTHER PUBLICATIONS

International Search Report for PCT/JP2019/007251 dated Apr. 23, 2019.

* cited by examiner

GRAIN-ORIENTED ELECTRICAL STEEL SHEET

TECHNICAL FIELD OF THE INVENTION

The present invention relates to a grain-oriented electrical steel sheet.

Priority is claimed on Japanese Patent Application No. 2018-032552, filed Feb. 26, 2018, the content of which is incorporated herein by reference.

RELATED ART

There is a grain-oriented electrical steel sheet in which magnetic domains are refined by grooves formed on the surface by a laser process (For example, refer to Patent Document 1). This grain-oriented electrical steel sheet is used for, for example, a wound iron core in a transformer (transformer). In the wound iron core, a plurality of grain-oriented electrical steel sheets is wound in a laminated state.

In a manufacturing step of the transformer, stress relief annealing for eliminating distortion strains (bending strains) in the wound iron core is carried out. In the stress relief annealing, for example, the wound iron core is heated to, for example, approximately 800° C.

PRIOR ART DOCUMENT

Patent Document

[Patent Document 1] Japanese Patent No. 5234222

DISCLOSURE OF THE INVENTION

Problems to be Solved by the Invention

However, when a wound iron core formed of a grain-oriented electrical steel sheet having grooves formed on the surface by a laser process is stress-relief-annealed, there is a possibility that the iron loss of the wound iron core (grain-oriented electrical steel sheet) may deteriorate (increase).

As a result of studies regarding a wound iron core made of a grain-oriented electrical steel sheet having grooves formed therein, the inventors of the present application found that, when the grooves are formed by a laser process, distortion is generated in the steel sheet microstructure of the groove bottom part, and this distortion finally affects the iron loss of the wound iron core. Furthermore, the present inventors found that the iron loss of the wound iron core can be reduced by controlling this distortion and reached the present invention.

In consideration of the above-described circumstance, the present invention aims to suppress the deterioration of the iron loss of a wound iron core by stress relief annealing in a manufacturing step of a transformer.

Means for Solving the Problem

The present invention has been completed on the basis of the above-described knowledge, and the gist thereof is as described below.

A grain-oriented electrical steel sheet according to a first aspect is a grain-oriented electrical steel sheet, in which a groove is formed on a surface thereof, wherein, in a cross section of the grain-oriented electrical steel sheet orthogonal to the groove, a KAM value in a region, which is on a central side in a thickness direction of the grain-oriented electrical steel sheet with respect to the groove and which is surrounded by a square of which one side is in contact with a groove bottom of the groove and a length in each side of which is 50 μm, is 0.1 or more and 3.0 or less.

In the grain-oriented electrical steel sheet according to the present aspect, the groove is preferably a laser groove.

In the grain-oriented electrical steel sheet according to the present aspect, wherein the KAM value is preferably 0.1 or more and 2.0 or less.

Effects of the Invention

According to the above-described aspect, it is possible to suppress the deterioration of the iron loss of a wound iron core by stress relief annealing in a manufacturing step of a transformer.

EMBODIMENTS OF THE INVENTION

Figure 1:
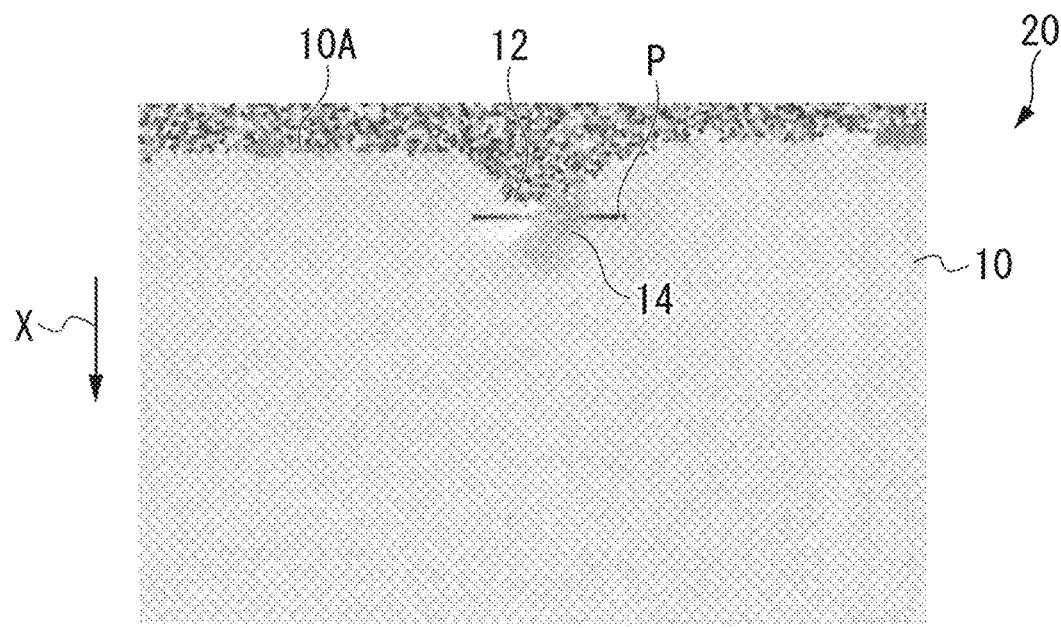
FIG. 1 is a cross-sectional photograph including a portion in which a groove is formed in a surface layer area of a grain-oriented electrical steel sheet configuring a stress-relief-annealed wound iron core.

Hereinafter, an embodiment of a grain-oriented electrical steel sheet according to the present invention will be described. The embodiment to be described below will be described in order for the better understanding of the gist of the present invention, and the grain-oriented electrical steel sheet according to the present invention is not limited to the description of the following embodiment.

Hereinafter, an embodiment will be described with reference to drawings.

(Grain-Oriented Electrical Steel Sheet)

The grain-oriented electrical steel sheet according to the present embodiment is an electrical steel sheet in which the magnetization easy axes of crystal grains (a <100> direction of a body-centered cubic crystal) are substantially aligned in a rolling direction described below. In addition, the grain-oriented electrical steel sheet has a plurality of magnetic domains magnetized in the rolling direction.

On a surface of the grain-oriented electrical steel sheet according to the present embodiment, a plurality of grooves is formed by a laser process. The plurality of grooves extends in the width direction of the grain-oriented electrical steel sheet and is arrayed in the rolling direction at intervals. Due to these grooves, the magnetic domains of the grain-oriented electrical steel sheet are refined. This grain-oriented electrical steel sheet is likely to be magnetized in the rolling direction described below. Therefore, the grain-oriented electrical steel sheet is suitable for a wound iron core (core material) in a transformer in which the flow directions of lines of magnetic force are substantially constant. The wound iron core is wound, for example, in a state in which a plurality of grain-oriented electrical steel sheets is laminated together.

A steel sheet main body of the grain-oriented electrical steel sheet according to the present embodiment is made of an iron alloy containing Si.

The composition of the steel sheet main body is, as an example, Si; 2.0% by mass or more and 4.0% by mass or less, C; 0.003% by mass or less, Mn; 0.05% by mass or more and 0.15% by mass or less, acid-soluble Al; 0.003% by mass or more and 0.040% by mass or less, N; 0.002% by mass or less, and S; 0.020% by mass or less with a remainder being Fe and an inevitable impurity. The thickness of the steel sheet main body is, for example, 0.15 mm or more and 0.35 mm or less.

A surface of the steel sheet main body is coated with a glass film. The glass film is made of, for example, a complex oxide such as Forsterite ($Mg_2SiO_4$), Spinel ($MgAl_2O_4$), or Cordierite ($Mg_2Al_4Si_5O_{18}$). The thickness of this glass film is, for example, 1 μm.

The glass film is further coated with an insulating coating. The insulating coating is made of, for example, an insulating coating agent mainly including colloidal silica and a phosphate (magnesium phosphate, aluminum phosphate, or the like) (coating liquid) or an insulating coating agent obtained by mixing alumina sol and boric acid (coating liquid)

(Manufacturing Method of Grain-Oriented Electrical Steel Sheet)

Next, an example of a manufacturing method of a grain-oriented electrical steel sheet will be described. The manufacturing method of a grain-oriented electrical steel sheet includes, for example, a casting step, a hot rolling step, an annealing step, a cold rolling step, a decarburization annealing step, an annealing separating agent application step, a final finish annealing step, an insulating coating agent application step, a flattening annealing step, a laser groove formation step, a heat treatment step, and an insulating coating re-formation step.

(Casting Step to Annealing Step)

First, in the casting step (continuous casting step), a slab is formed by continuous casting.

Next, in the hot rolling step, the slab is hot-rolled, thereby forming a hot-rolled steel sheet having a predetermined thickness. Next, in the annealing step, the hot-rolled steel sheet is annealed at a predetermined temperature, for example, 1,100° C.

(Cold Rolling Step)

Next, in the cold rolling step, the hot-rolled steel sheet is drawn out in a predetermined direction (hereinafter, referred to as the "rolling direction"), thereby forming a steel sheet having a predetermined thickness (cold-rolled steel sheet). The rolling direction coincides with the longitudinal direction of the cold-rolled steel sheet (grain-oriented electrical steel sheet).

(Decarburization Annealing Step)

Next, in the decarburization annealing step, the cold-rolled steel sheet is decarburization-annealed (continuously annealed) at a predetermined temperature (for example, 700° C. to 900° C.). Therefore, the cold-rolled steel sheet is decarburization-annealed, and primary recrystallization (crystal grain size: 10 to 30 μm) occurs in the cold-rolled steel sheet. In addition, if necessary, it is also possible to nitride the steel sheet in an ammonia-containing atmosphere by a heat treatment during decarburization annealing or after decarburization annealing (for example, 150 to 300 ppm).

(Annealing Separating Agent Application Step)

Next, in the annealing separating agent application step, an annealing separating agent including MgO as a main component is applied to a surface of the cold-rolled steel sheet. After that, the cold-rolled steel sheet is wound in a coil shape.

(Final Annealing Step)

Next, in the final annealing step, the cold-rolled steel sheet wound in a coil shape is annealed (batch-annealed) at a predetermined temperature (for example, approximately 1,200° C.) for a predetermined time (for example, approximately 20 hours). Therefore, secondary recrystallization occurs in the cold-rolled steel sheet, a crystal orientation in which magnetization easy axes are substantially aligned in the rolling direction is generated, and a glass film is formed on the surface of the cold-rolled steel sheet. As a result, a grain-oriented electrical steel sheet is formed. After that, the coil-shaped grain-oriented electrical steel sheet is unwound.

Here, the cold-rolled steel sheet includes an inhibitor, for example, MnS, AlN, or the like. Therefore, in the final annealing step, crystal grains having the Goss orientation in which magnetization easy axes are substantially aligned in the rolling direction preferentially grow. As a result, a grain-oriented electrical steel sheet having a high crystal orientation is formed.

(Insulating Coating Agent Application Step)

Next, in the insulating coating agent application step, an insulating coating agent having an electrical insulation property and capable of imparting a predetermined tensile force to the surface of the grain-oriented electrical steel sheet (coating liquid) is applied to the surface of the grain-oriented electrical steel sheet.

(Flattening Annealing Step)

Next, in the flattening annealing step, the grain-oriented electrical steel sheet is annealed (flattening-annealed) at a predetermined temperature (for example, 800° C. to 850° C.) for a predetermined time (for example, 10 seconds or longer and 120 seconds or shorter) while being transported by a transportation device. At this time, a tensile force (thread tensile force) is imparted in the rolling direction (longitudinal direction) of the grain-oriented electrical steel sheet from the transportation device to the grain-oriented electrical steel sheet. Therefore, curls or strains in the cold-rolled steel sheet during final finish annealing are removed, and the grain-oriented electrical steel sheet is flattened.

In addition, in the flattening annealing step, when the grain-oriented electrical steel sheet is annealed, the insulating coating agent is attached to the surface of the grain-oriented electrical steel sheet, and the surface of the grain-oriented electrical steel sheet is insulated and coated with the insulating coating agent. After that, the grain-oriented electrical steel sheet is cooled.

(Laser Groove Formation Step)

Next, in the laser groove formation step, a plurality of grooves (laser grooves) is formed by a laser process on the surface of the grain-oriented electrical steel sheet transported by the transportation device. Specifically, the grain-oriented electrical steel sheet is transported to a laser irradiation device by the transportation device.

At this time, to the grain-oriented electrical steel sheet, a tensile force (thread tensile force) of 2 MPa or more and 15 MPa or less is imparted in the rolling direction (longitudinal direction) of the grain-oriented electrical steel sheet from the transportation device. In this state, laser beams radiated from the laser irradiation device are radiated (scanned) to the surface of the grain-oriented electrical steel sheet along the width direction of the grain-oriented electrical steel sheet. The thread tensile force is more preferably in a range of 2 MPa or more and 9 MPa or less.

In addition, the laser grooves are formed at predetermined intervals (pitches) in the rolling direction of the grain-oriented electrical steel sheet. Therefore, the magnetic domains of the grain-oriented electrical steel sheet are refined by the plurality of laser grooves, and the iron loss of the grain-oriented electrical steel sheet is reduced.

The kind of the laser beam is set to, for example, a fiber laser, a YAG laser, or a CO2 laser. In addition, the wavelength of the laser beam is set to, for example, 1,070 to 1,090 nm or 10.6 μm. Furthermore, the depth of each groove is set to, for example, 20 μm. In addition, the width of the groove is set to, for example, 50 μm. Furthermore, the interval (pitch) between the grooves is set to, for example, 3 mm.

(Insulating Coating Re-Formation Step)

In the above-described laser groove formation step, the insulating coating that coats the surface of the grain-oriented electrical steel sheet is partially removed. Therefore, in the insulating coating re-formation step, the surface of the grain-oriented electrical steel sheet is, again, insulated and coated.

Specifically, an insulating coating agent (coating liquid) having electrical insulation properties and capable of imparting a predetermined tensile force to the surface of the steel sheet is applied to the surface of the grain-oriented electrical steel sheet. The grain-oriented electrical steel sheet to which the insulating coating agent has been applied is heated to a predetermined temperature (for example, 800° C. to 850° C.) and then cooled. As a result, the insulating coating agent is baked on the surface of the grain-oriented electrical steel sheet, and the surface of the grain-oriented electrical steel sheet is insulated by the insulating coating agent. As a result, a grain-oriented electrical steel sheet is manufactured. The insulating coating re-formation step is an example of the insulating coating forming step.

After that, the grain-oriented electrical steel sheet is cooled at, for example, 20° C./s or more and 100° C./s or less. Therefore, the grain-oriented electrical steel sheet is manufactured.

In this insulating coating re-formation step, the grain-oriented electrical steel sheet is cooled at 20° C./s or more and 100° C./s or less, whereby a grain-oriented electrical steel sheet having a KAM value of 0.1 or more and 0.3 or less in the above-described groove peripheral region is obtained.

The cooling rate of the grain-oriented electrical steel sheet is adjusted by, for example, the amount of a cooling liquid or a cooling air sprayed to the grain-oriented electrical steel sheet or the transportation rate of the grain-oriented electrical steel sheet. In addition, the insulating coating re-formation step is an example of the insulating coating formation step.

Effect

Next, the effect of the present embodiment will be described.

The grain-oriented electrical steel sheet manufactured by the manufacturing method of a grain-oriented electrical steel sheet according to the present embodiment is used for, for example, a wound iron core in a transformer. In the wound iron core, a plurality of the grain-oriented electrical steel sheets is wound in a laminated state.

In a manufacturing step of the transformer, stress relief annealing (SRA) for eliminating distortion strains (bending strains) in the wound iron core is carried out. In the stress relief annealing, for example, the wound iron core is heated to, for example, approximately 800° C.

However, when the wound iron core formed of the grain-oriented electrical steel sheet having the grooves formed by a laser process on the surface is stress-relief-annealed, the iron loss of the wound iron core (grain-oriented electrical steel sheet) deteriorates (increases).

Specifically, FIG. 1 shows a cross-sectional microstructure of a wound iron core 20 stress-relief-annealed at 800° C. for two hours in the manufacturing step of the transformer. This wound iron core 20 is formed of a grain-oriented electrical steel sheet 10 having a groove 12 formed on a surface 10A in the laser groove formation step. FIG. 1 shows a microstructural photograph of a cross section orthogonal to the groove 12 formed on the surface 10A in the grain-oriented electrical steel sheet 10 configuring the wound iron core 20.

As shown in FIG. 1, when the wound iron core 20 formed of the grain-oriented electrical steel sheet 10 having the groove 12 formed on the surface 10A by a laser process is stress-relief-annealed, a subgrain boundary 14 is generated on a central side (arrow X side) in the thickness direction of the grain-oriented electrical steel sheet 10 with respect to the groove 12. The subgrain boundary refers to a low-angle grain boundary in which the orientation difference (crystal orientation difference) is 15° or less.

Figure 2:
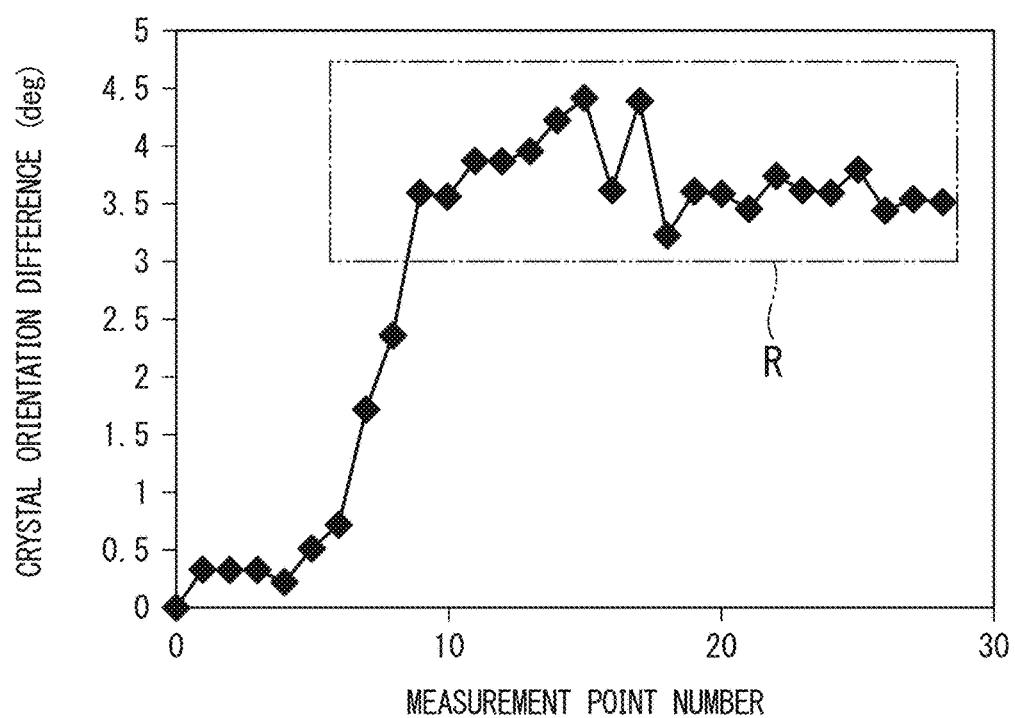
FIG. 2 is a graph showing analysis results of crystal orientation differences at an analysis position of the grain-oriented electrical steel sheet shown in FIG. 1 by electron backscatter diffraction (EBSD).

In addition, FIG. 2 shows the analysis results of the crystal orientation differences on the central side in the thickness direction of the grain-oriented electrical steel sheet 10 with respect to the groove 12. In the present analysis, a cross section perpendicular to a surface of the steel sheet including the rolling direction of the grain-oriented electrical steel sheet 10 shown in FIG. 1 was almost distortion-freely polished with colloidal silica or colloidal alumina, and the crystal orientation differences were analyzed by electron backscatter diffraction (EBSD) at a plurality of analysis points on an analysis position P.

The horizontal axis of a graph shown in FIG. 2 indicates the measurement point numbers of the measurement points of crystal orientations arranged at equal intervals on the analysis position P in FIG. 1 from the left side. In addition, the vertical axis of the graph shown in FIG. 2 indicates crystal orientation differences (deg) at the respective analysis points. As the crystal orientation differences, the integral values from a reference point (origin) at which the subgrain boundary 14 was not present were used.

The measurement points at which these integral values were obtained were set to a depth position 5 μm away from the groove bottom in an X direction (a direction toward the central side in the thickness direction of the grain-oriented electrical steel sheet) with respect to the concave groove 12 shown in FIG. 1. In addition, at this depth position, 29 places arranged at equal intervals (2 μm intervals) in a range corresponding to the groove width in a direction parallel to the surface of the steel sheet were used as the measurement points.

As shown in FIG. 1, a region having a different contrast from the circumference, which is considered as the subgrain boundary 14, is generated below the groove 12, and thus the first left measurement point of these measurement points is determined as the reference point at which the subgrain boundary 14 was not present.

As shown in FIG. 2, in a region R surrounded by a two-dot chain line, the crystal orientation differences reach 3 to 5 (deg). From this fact, it is found that the subgrain boundary 14 (refer to FIG. 1) is generated on the central side (arrow X side) in the thickness direction of the grain-oriented electrical steel sheet 10 with respect to the groove 12.

In addition, when the subgrain boundary 14 is generated on the central side in the thickness direction of the grain-oriented electrical steel sheet 10 with respect to the groove 12, as is clear from test results described below, the iron loss of the wound iron core 20 (grain-oriented electrical steel sheet 10) deteriorates.

Figure 3:
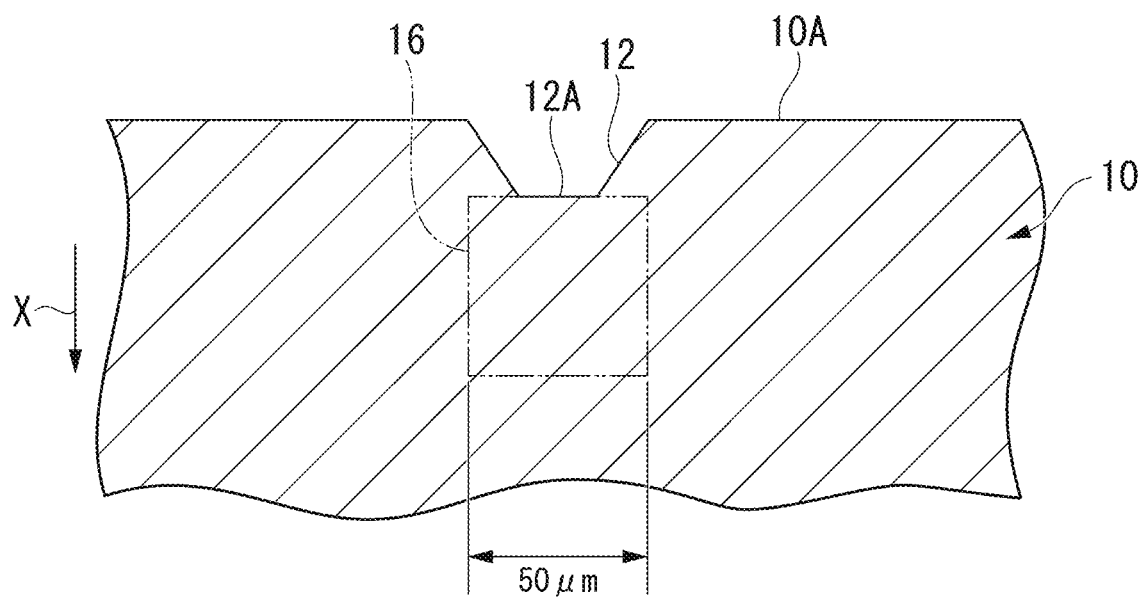
FIG. 3 is a cross-sectional view schematically showing a microstructure of a groove peripheral region in the grain-oriented electrical steel sheet to be stress-relief-annealed (before SRA).

FIG. 3 schematically shows the cross section of the grain-oriented electrical steel sheet 10 to be stress-relief-annealed. On the surface 10A of the grain-oriented electrical steel sheet 10, the groove 12 is formed by a laser process. In this grain-oriented electrical steel sheet 10, the KAM value in a region on the central side (arrow X side) in the thickness direction of the grain-oriented electrical steel sheet 10 with respect to the groove 12 (hereinafter, referred to as the "groove peripheral region") 16 increases.

FIG. 1 shows a cross section orthogonal to the groove 12 on the surface 10A of the grain-oriented electrical steel sheet 10. That is, FIG. 1 shows a cross section of the grain-oriented electrical steel sheet 10 cut along the width direction. In addition, the groove peripheral region 16 refers to, for example, in the cross section of the grain-oriented electrical steel sheet 10 shown in FIG. 3, a region on the central side (arrow X side) in the thickness direction of the grain-oriented electrical steel sheet 10 with respect to the groove 12 and a region surrounded by a square having one side in contact with a groove bottom 12A of the groove 12 and having a length of 50 μm in each side.

In addition, the groove bottom 12A of the groove 12 mentioned herein refers to the deepest portion of the groove 12. Furthermore, the fact that one side of the square is in contact with the groove bottom 12A of the groove 12 refers to a state in which one side of the square is in contact with the groove bottom 12A (the deepest portion) of the groove 12 in a state in which the side is placed parallel to the surface 10A of the grain-oriented electrical steel sheet 10.

The measurement of the Kernel Average Misorientation (KAM) value can be obtained by, as an example, carrying out a strain-free cross section process by ion milling or the like on the above-described cross section of the grain-oriented electrical steel sheet 10 and analyzing the crystal orientation differences by the electron backscatter diffraction (EBSD) of a field emission-scanning electron microscope (FE-SEM).

Figure 4:
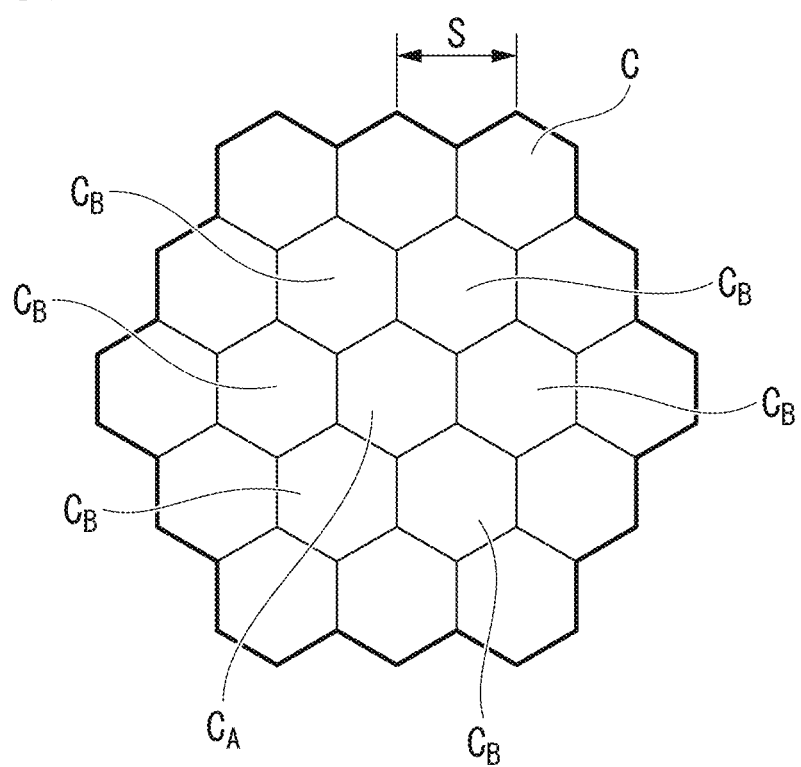
FIG. 4 is a schematic view showing pixels used for mapping by EBSD.

At this time, for example, the KAM value can be obtained by using hexagonal pixels C as shown in FIG. 4 and mapping the groove peripheral region 16 shown in FIG. 3.

For example, the average value of orientation differences between a specific pixel $C_A$ and six pixels $C_D$ adjacent to the specific pixel is computed, and this average value can be regarded as the KAM value of the predetermined pixel $C_A$. In addition, the KAM value of the groove peripheral region 16 can also be determined by regulating a step size of, for example, approximately 0.1 to 1 μm in the groove peripheral region 16, setting a probe diameter to 10 nm or the like, computing the KAM values at a considerable number, for example, 10,000 places in the groove peripheral region 16, and adopting the absolute maximum value thereof.

In the case of determining the KAM value as described above, pixels being used are not limited to the hexagonal pixels C shown in FIG. 4, and pixels with a different shape such as a square may also be used.

Here, as is clear from the test results described below, when a wound iron core formed of the grain-oriented electrical steel sheet 10 having a KAM value of more than 3.0 in the groove peripheral region 16 is stress-relief-annealed in the manufacturing step of the transformer, there is a possibility that the subgrain boundary 14 may be generated on the central side in the thickness direction of the grain-oriented electrical steel sheet 10 with respect to the groove 12 and the iron loss of the wound iron core may deteriorate.

On the other hand, even when a wound iron core formed of the grain-oriented electrical steel sheet 10 having a KAM value of 0.1 or more and 3.0 or less in the groove peripheral region 16 is stress-relief-annealed in the manufacturing step of the transformer, the subgrain boundaries generated on the central side in the thickness direction of the grain-oriented electrical steel sheet 10 with respect to the groove 12 are reduced and the iron loss of the wound iron core does not deteriorate.

Therefore, in the present embodiment, a thread tensile force of 2 MPa or more and 15 MPa or less is imparted to the grain-oriented electrical steel sheet 10 in the laser groove formation step such that the KAM value in the groove peripheral region 16 of the grain-oriented electrical steel sheet 10 reaches 0.1 or more and 3.0 or less.

In addition, in the present embodiment, the cooling rate of the grain-oriented electrical steel sheet 10 is adjusted to 20° C./s or more and 100° C./s or less in the flattening annealing step such that the KAM value in the groove peripheral region 16 of the grain-oriented electrical steel sheet 10 reaches 0.1 or more and 3.0 or less.

In such a case, the deterioration of the iron loss in the wound iron core (the grain-oriented electrical steel sheet 10) can be suppressed even when the wound iron core is stress-relief-annealed in the manufacturing step of the transformer.

EXAMPLES

Next, an example will be described.

In the present example, a KAM value in a groove peripheral region of a grain-oriented electrical steel sheet having grooves formed on a surface by a laser process was measured.

Next, a 25 KVA monolayer wound iron core was produced from the grain-oriented electrical steel sheet for which the KAM value was measured. In addition, the produced wound iron core was stress-relief-annealed, and the iron loss of a wound iron core (grain-oriented electrical steel sheet) was measured. A similar wound iron core was produced using a grain-oriented electrical steel sheet having no grooves formed on the surface, and the transformer iron loss was 36 W. The iron loss of the wound iron core made of this grain-oriented electrical steel sheet having no grooves formed thereon was regarded as a reference value and compared with the iron loss of the wound iron core made of the grain-oriented electrical steel sheet for which the KAM value was measured, thereby obtaining an iron loss improvement percentage (%) described below.

Next, a cross section of the stress-relief-annealed wound iron core was analyzed, and the presence or absence of a subgrain boundary was confirmed.

(Grain-Oriented Electrical Steel Sheet)

The grain-oriented electrical steel sheets were manufactured using the same manufacturing method as the embodiment. In the insulating coating re-formation step, the heating temperature (baking temperature) of the grain-oriented electrical steel was set to 800° C. to 850° C., and the cooling rate of the grain-oriented electrical steel sheet was set to 20° C./s or more and 100° C./s or less.

For the grain-oriented electrical steel sheets, the amount of Si was 3.3%, the sheet thickness was 0.23 mm, B8 was 1.930 T, and W17/50 was 0.860 w/kg. B8 refers to the density of magnetic flux [T] generated in the grain-oriented electrical steel sheet when the grain-oriented electrical steel sheet is magnetized in a rolling direction by a magnetizing force of 800 A/m.

(Processing Conditions for Laser Grooves)

In addition, in the laser groove formation step, the processing conditions for the grooves (laser grooves) formed on the surface of the grain-oriented electrical steel sheet are as described below.

Kind of laser beam: Fiber laser
Wavelength of laser beam: 1,080 nm
Output of laser beam: 1,000 W
Diameter of laser beam: 0.1×0.3 mm
Scanning rate of laser beam: 30 m/s
Intervals between grooves (pitches): 3 mm
Depth of groove: 20 μm
Width of groove: 50 μm
Thread tensile force of grain-oriented electrical steel sheet: 2 MPa or more and 15 MPa or less (Measurement of KAM Value)

As described above, FIG. 3 shows the cross section of the grain-oriented electrical steel sheet 10 having the groove 12 formed on the surface 10A by a laser process. In the cross section of this grain-oriented electrical steel sheet 10, the KAM value in the groove peripheral region 16 on the central side (arrow X side) in the thickness direction of the grain-oriented electrical steel sheet 10 with respect to the groove 12 was measured. The KAM value refers to an index indicating the degree of a relative difference between the orientations of adjacent crystal grains in a predetermined cross section of the grain-oriented electrical steel sheet.

In the measurement of the Kernel Average Misorientation (KAM) value, a strain-free cross section process was carried out by ion milling or the like in the cross section of the grain-oriented electrical steel sheet 10, and the crystal orientation differences were analyzed by the electron backscatter diffraction (EBSD) of a field emission-scanning electron microscope (FE-SEM). At this time, hexagonal pixels C were used as shown in FIG. 4, and the groove peripheral region 16 was mapped.

Next, the average value of orientation differences between a predetermined pixel $C_A$ and six pixels $C_B$ adjacent to the pixel $C_A$ was computed, and this average value was regarded as the KAM value of the predetermined pixel $C_A$. In addition, the absolute maximum value of the KAM values of the pixels C in the groove peripheral region 16 was regarded as the KAM value of the groove peripheral region 16.

The step size S of the pixel C was, for example, 0.1 to 1 μm. In addition, the probe diameter was set to 10 nm. In the present example, the step size was set to 0.5 μm. Therefore, for the groove peripheral region 16, the KAM values at 10,000 places were computed, and the absolute maximum value thereof was regarded as the KAM value of the groove peripheral region 16.

(Iron Loss Improvement Percentage of Wound Iron Core)

The iron loss improvement percentage r of the wound iron core was computed from Expression (1) by obtaining an iron loss W0 of the wound iron core formed of the grain-oriented electrical steel sheet having no grooves formed thereon and an iron loss Wg of the wound iron core formed of the grain-oriented electrical steel sheet having grooves formed by a laser process.

$$\eta = (W0 - Wg)/W0 \times 100 \quad \text{Expression (1)}$$

The iron losses W0 and Wg of the wound iron cores were measured using an electric power meter after a primary winding (excitation winding) and a secondary winding (search coil) were wound around the wound iron cores respectively.

(Test Results)

Figure 5:
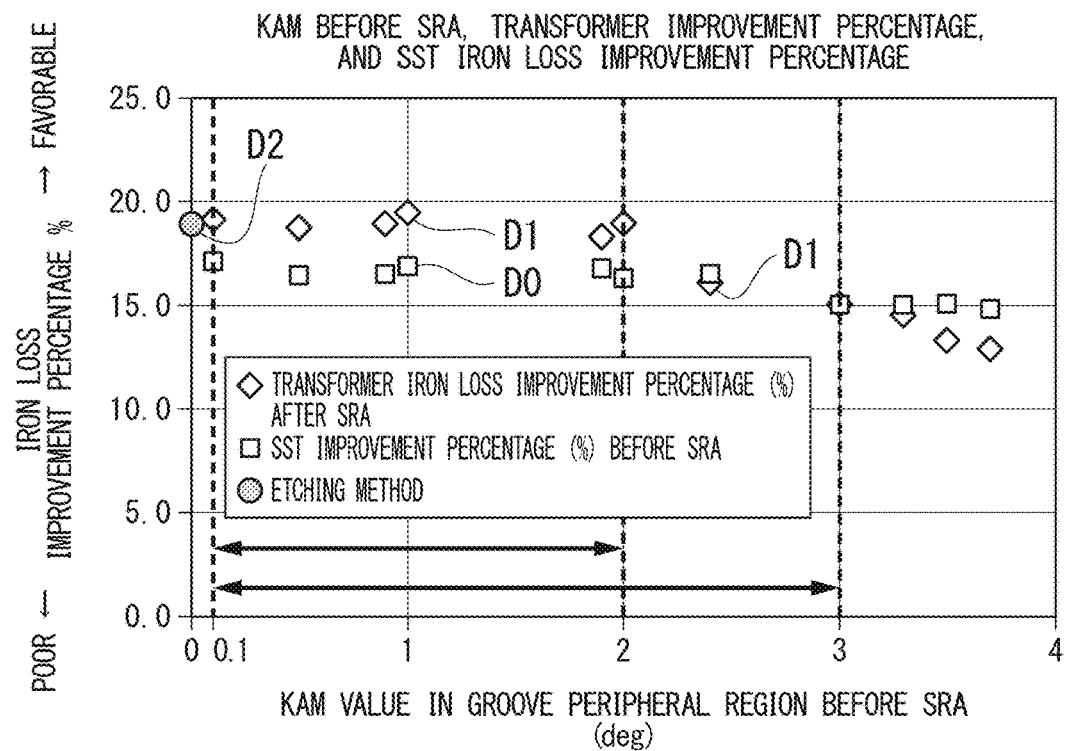
FIG. 5 is a graph showing a relationship between a KAM value of the groove peripheral region of the grain-oriented electrical steel sheet to be stress-relief-annealed, and an iron loss improvement percentage of the stress-relief-annealed wound iron core, and an iron loss improvement percentage of a single sheet to be stress-relief-annealed (SST improvement percentage).

A relationship among the KAM value of the groove peripheral region of the grain-oriented electrical steel sheet to be stress-relief-annealed, the iron loss improvement percentage t of the stress-relief-annealed wound iron core (grain-oriented electrical steel sheet), and the iron loss improvement percentage of a single sheet to be stress-relief-annealed (SST improvement percentage: an improvement percentage based on an iron loss value measured by a single sheet test (regulated in JIS C2556)) is shown in FIG. 5.

A plot indicated by a reference symbol D1 (◇ as a sign) in FIG. 5 is about the iron loss improvement percentage η of the stress-relief-annealed wound iron core formed on the grain-oriented electrical steel sheet having grooves formed on the surface by a laser process. In addition, a plot indicated by a reference symbol D2 in FIG. 5 is about the iron loss improvement percentage η of the stress-relief-annealed wound iron core having grooves formed on the surface by an etching method described below.

In addition, a plot indicated by a reference symbol D0 (o as a sign) in FIG. 5 is about the iron loss improvement percentage of a single sheet to be stress-relief-annealed (SST improvement percentage). The iron loss improvement percentage η of the grain-oriented electrical steel sheet was computed from Expression (1) by respectively measuring the iron loss W0 of the grain-oriented electrical steel sheet having no grooves and the iron loss Wg of the grain-oriented electrical steel sheet having grooves formed by a laser process using a single sheet tester (SST) method which is a well-known iron loss measurement method. Therefore, in a case where the iron loss improvement percentage t of the wound iron core is lower than the iron loss improvement percentage of the single sheet to be stress-relief-annealed, it is confirmed that stress relief annealing deteriorates the iron loss.

As shown in FIG. 5, a stress-relief-annealed wound iron core formed of a grain-oriented electrical steel sheet having a KAM value of more than 3.0 in the groove peripheral region has an iron loss improvement percentage η lower than the iron loss improvement percentage of the single sheet, and thus it is possible to determine that the iron loss of the wound iron core deteriorated.

In addition, in the stress-relief-annealed wound iron core formed of the grain-oriented electrical steel sheet having a KAM value of more than 3.0 in the groove peripheral region, for example, as shown in FIG. 1, the subgrain boundary 14 was generated on the central side (arrow X side) in the thickness direction of the grain-oriented electrical steel sheet 10 with respect to the groove 12.

On the other hand, as shown in FIG. 5, a stress-relief-annealed wound iron core formed of a grain-oriented electrical steel sheet having a KAM value of 0.1 or more and 3.0 or less in the groove peripheral region had an iron loss improvement percentage η that became equal to or higher than the iron loss improvement percentage of the single sheet, and thus the iron loss of the wound iron core was reduced.

In addition, in the stress-relief-annealed wound iron core formed of the grain-oriented electrical steel sheet having a KAM value of 0.1 or more and 3.0 or less in the groove peripheral region, no subgrain boundary was generated or subgrain boundaries were reduced on the central side in the thickness direction of the grain-oriented electrical steel sheet with respect to the groove 12.

From the above-described facts, it was found that, in the stress-relief-annealed wound iron core formed of the grain-oriented electrical steel sheet having a KAM value of more than 3.0 in the groove peripheral region, a subgrain boundary was generated in a region on the central side in the thickness direction of the grain-oriented electrical steel sheet with respect to the groove 12 and the iron loss of the wound iron core deteriorated.

On the other hand, it was found that, in the wound iron core formed of the grain-oriented electrical steel sheet having a KAM value of 0.1 or more and 3.0 or less in the groove peripheral region, even when the wound iron core was stress-relief-annealed, the generation of a subgrain boundary on the central side in the thickness direction of the grain-oriented electrical steel sheet with respect to the groove 12 was suppressed and the iron loss of the wound iron core did not deteriorate.

Here, the cause of the deterioration of the iron loss of the stress-relief-annealed wound iron core is considered to be the subgrain boundary generated on the central side in the thickness direction of the grain-oriented electrical steel sheet with respect to the groove in the stress-relief-annealed wound iron core. The amount of this subgrain boundary generated has a correlation with the KAM value in the groove peripheral region of the grain-oriented electrical steel sheet to be stress-relief-annealed.

That is, when the KAM value in the groove peripheral region of the grain-oriented electrical steel sheet to be stress-relief-annealed increases, in the stress-relief-annealed wound iron core, the amount of the subgrain boundary generated on the central side in the thickness direction of the grain-oriented electrical steel sheet with respect to the groove increases. On the other hand, when the KAM value in the groove peripheral region of the grain-oriented electrical steel sheet to be stress-relief-annealed decreases, in the stress-relief-annealed wound iron core, the amount of the subgrain boundary generated on the central side in the thickness direction of the grain-oriented electrical steel sheet with respect to the groove decreases.

Therefore, it is possible to assume (evaluate) whether or not the iron loss of a wound iron core deteriorates during the stress relief annealing of a transformer on the basis of the KAM value in the groove peripheral region of the grain-oriented electrical steel sheet to be stress-relief-annealed. In addition, in a manufacturing step of the grain-oriented electrical steel sheet, the iron loss of a stress-relief-annealed wound iron core can be efficiently reduced by decreasing the KAM value in the groove peripheral region of the grain-oriented electrical steel sheet.

Here, as a supplement to the lower limit of the KAM value, as the KAM value in the groove peripheral region of the grain-oriented electrical steel sheet decreases, subgrain boundaries generated in the stress-relief-annealed wound iron core are decreased, and the iron loss of the wound iron core is reduced. Therefore, the KAM value in the groove peripheral region is preferably as small as possible. However, in a laser process, a KAM value of at least 0.1 can be generated due to the characteristics of the laser process. Therefore, in the present embodiment, the lower limit of the KAM value is set to 0.1.

In the case of forming grooves on the surface of the grain-oriented electrical steel sheet using an etching method, it is assumed that the KAM value in the groove peripheral region reaches approximately zero [deg], but the etching method has a problem with the manufacturing cost, productivity, and the like. Therefore, when the manufacturing cost, productivity, and the like are taken into account, a laser processing method is superior to the etching method.

(Relationship Between Thread Tensile Force in Laser Groove Formation Step and Iron Loss Improvement Percentage of Wound Iron Core)

Next, a relationship between the thread tensile force of the grain-oriented electrical steel sheet in the laser groove formation step and the iron loss improvement percentage of the stress-relief-annealed wound iron core will be described.

In the present test, in the laser groove formation step, the thread tensile force imparted to the grain-oriented electrical steel sheet was changed as shown in Table 1, the KAM value in the groove peripheral region of the grain-oriented electrical steel sheet was measured, and the iron loss improvement percentage η of the stress-relief-annealed wound iron core was obtained

TABLE 1

| Thread tensile force (MPa) | KAM value in groove peripheral region before stress relief annealing (deg) | Iron loss improvement percentage of wound core after stress relief annealing (%) | Iron loss improvement percentage of single sheet SST before stress relief annealing (%) |
| --- | --- | --- | --- |
| 20 | 3.5 | 13.3 | 15.0 |
| 15 | 3 | 15.0 | 15.0 |
| 10 | 2.4 | 16.1 | 16.6 |
| 8 | 2 | 18.9 | 16.3 |

TABLE 1-continued

| Thread tensile force (MPa) | KAM value in groove peripheral region before stress relief annealing (deg) | Iron loss improvement percentage of wound core after stress relief annealing (%) | Iron loss improvement percentage of single sheet SST before stress relief annealing (%) |
|---|---|---|---|
| 5 | 1 | 19.5 | 16.9 |
| 2 | 0.5 | 18.7 | 16.4 |

Figure 6:
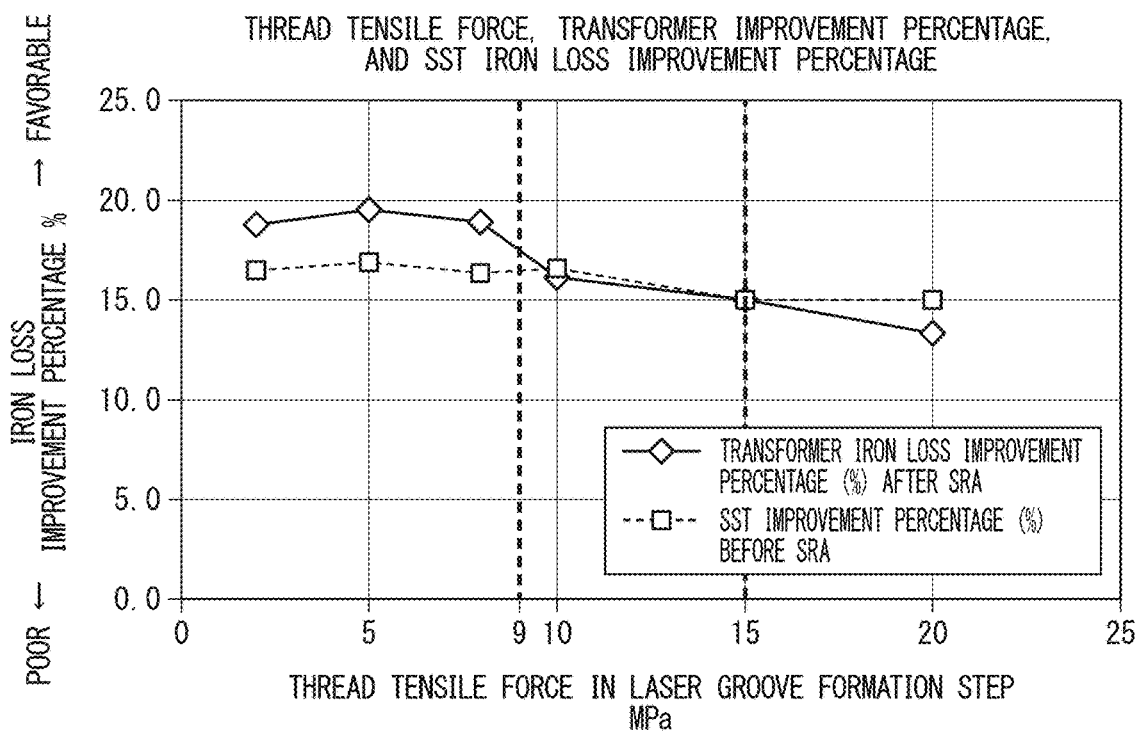
FIG. 6 is a graph showing a relationship among a thread tensile force in a laser groove formation step, the iron loss improvement percentage of the stress-relief-annealed wound iron core, and the iron loss improvement percentage of the single sheet to be stress-relief-annealed (SST improvement percentage).

A graph showing the relationship between the thread tensile force of the grain-oriented electrical steel sheet in the laser groove formation step and the iron loss improvement percentage η of the stress-relief-annealed wound iron core is shown in FIG. 6. As is clear from FIG. 6, when the thread tensile force of the grain-oriented electrical steel sheet exceeded 15 MPa, the iron loss improvement percentage η of the stress-relief-annealed wound iron core became lower than the iron loss improvement percentage of the single sheet (SST improvement percentage), and the iron loss of the wound iron core deteriorated.

On the other hand, when the thread tensile force of the grain-oriented electrical steel sheet was 9 MPa or less, the iron loss improvement percentage η of the wound iron core became higher than the iron loss improvement percentage of the single sheet (SST improvement percentage), and the iron loss of the wound iron core was reduced. Therefore, the thread tensile force of the grain-oriented electrical steel sheet is more preferably 9 MPa or less.

The thread tensile force in the laser groove formation step is preferably 2 MPa or more. This is because, when the thread tensile force is less than 2 MPa, the grain-oriented electrical steel sheet is likely to vibrate while being transported, and a process defect of the laser process is likely to be caused.

Figure 7:
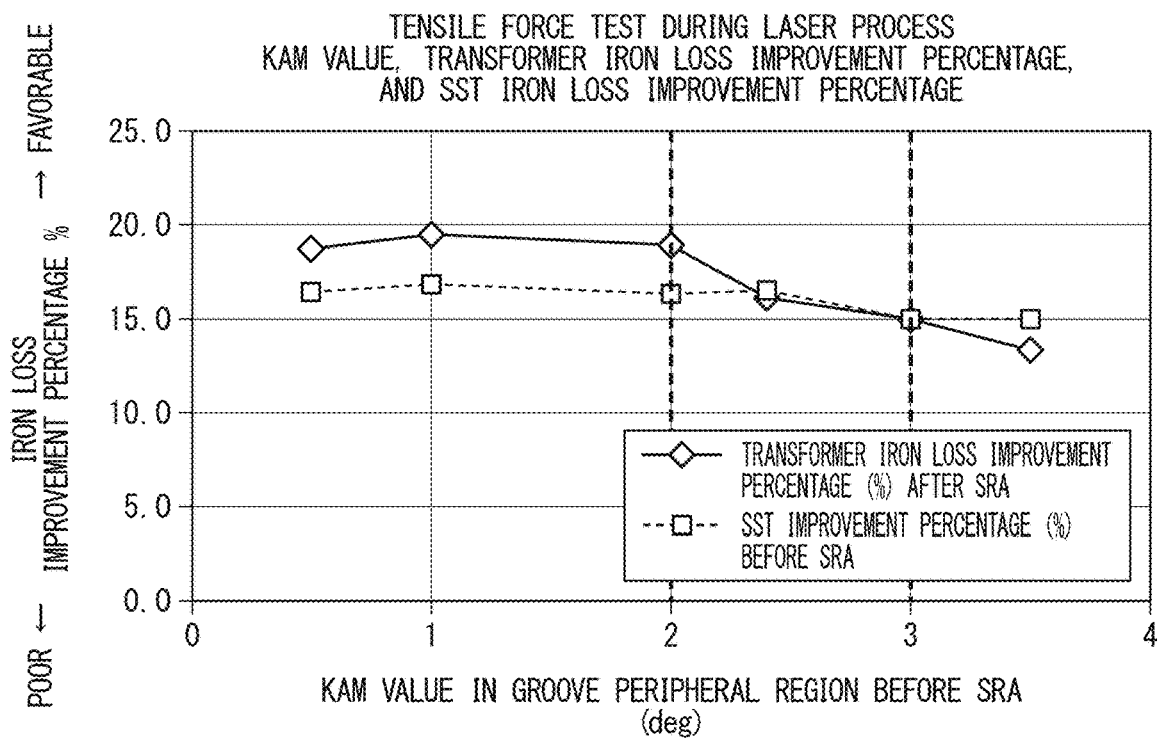
FIG. 7 is a graph showing a relationship among a KAM value in the groove peripheral region of the grain-oriented electrical steel sheet to be stress-relief-annealed, the iron loss improvement percentage of the stress-relief-annealed wound iron core, and the iron loss improvement percentage of the single sheet to be stress-relief-annealed (SST improvement percentage).

In addition, a graph showing a relationship between the KAM value in the groove peripheral region of the grain-oriented electrical steel sheet to be stress-relief-annealed and the iron loss improvement percentage of the stress-relief-annealed wound iron core is shown in FIG. 7. As is clear from FIG. 7, it could be confirmed that, when the KAM value in the groove peripheral region was 3.0 or less, the iron loss improvement percentage of the wound iron core became equal to or higher than the iron loss improvement percentage of the single sheet (SST improvement percentage), and, particularly, when the KAM value in the groove peripheral region was 2.0 or less, the iron loss improvement percentage η of the wound iron core became higher than the iron loss improvement percentage of the single sheet, and the iron loss was reduced. Therefore, the KAM value in the groove peripheral region is more preferably 2.0 or less.

(Relationship Between Cooling Rate in Insulating Coating Re-Formation Step after Formation of Laser Grooves and Iron Loss Improvement Percentage of Wound Iron Core)

Next, a relationship between the cooling rate of the grain-oriented electrical steel sheet in the insulating coating re-formation step carried out after the formation of the laser grooves and the iron loss improvement percentage η of the stress-relief-annealed wound iron core.

In the present example, in the insulating coating re-formation step carried out after the formation of the laser grooves, the cooling rate of the grain-oriented electrical steel sheet was changed as shown in Table 2, the KAM value in the groove peripheral region of the grain-oriented electrical steel sheet was measured, and the iron loss improvement percentage η of the stress-relief-annealed wound iron core was obtained

TABLE 2

| Cooling rate (° C./sec) | KAM value in groove peripheral region before stress relief annealing (deg) | Iron loss improvement percentage of wound core after stress relief annealing (%) | Iron loss improvement percentage of single sheet SST before stress relief annealing (%) |
|---|---|---|---|
| 20 | 0.1 | 19.1 | 17.1 |
| 50 | 0.9 | 18.9 | 16.6 |
| 70 | 1.9 | 18.3 | 16.8 |
| 100 | 3 | 15.0 | 15.0 |
| 120 | 3.3 | 14.5 | 15.0 |
| 150 | 3.7 | 12.9 | 14.8 |

Figure 8:
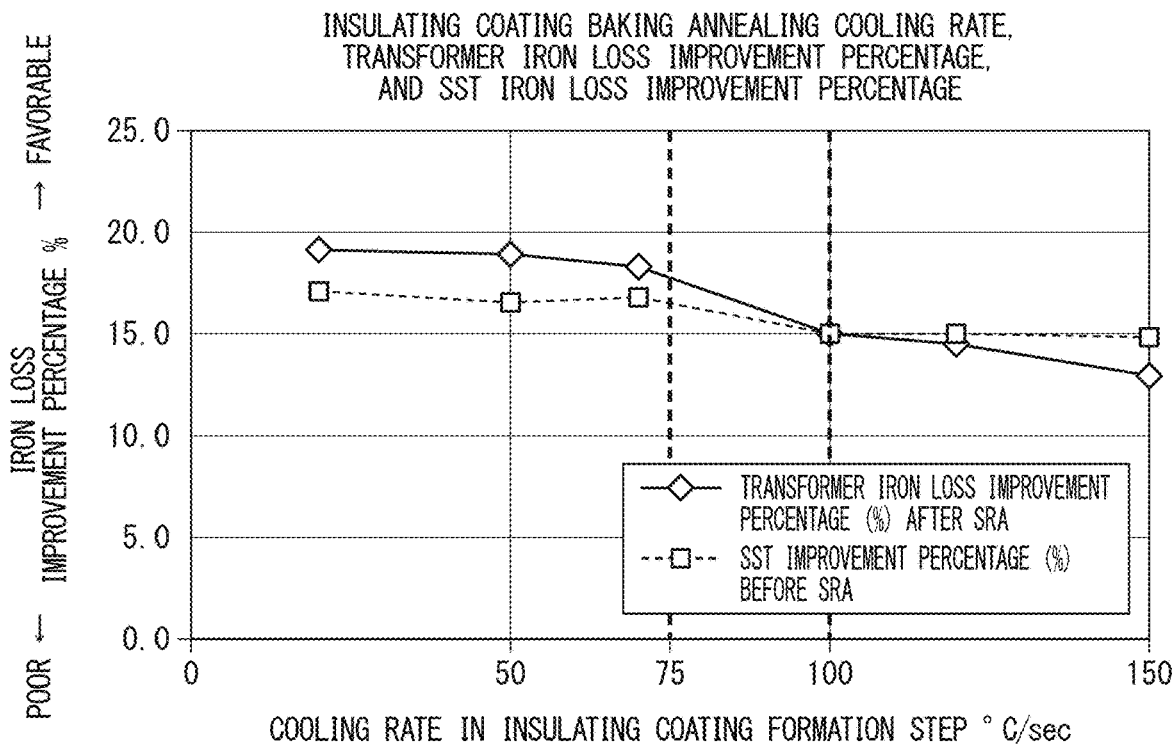
FIG. 8 is a graph showing a relationship among a cooling rate in an insulating coating re-formation step, the iron loss improvement percentage of the stress-relief-annealed wound iron core, and the iron loss improvement percentage of the single sheet to be stress-relief-annealed (SST improvement percentage).

A graph showing the relationship between the cooling rate of the grain-oriented electrical steel sheet in the insulating coating re-formation step carried out after the formation of the laser grooves and the iron loss improvement percentage of the stress-relief-annealed wound iron core is shown in FIG. 8. As is clear from FIG. 8, when the cooling rate of the grain-oriented electrical steel sheet was in a range of 20° C./s to 100° C./s, the iron loss improvement percentage η of the wound iron core became equal to or higher than the iron loss improvement percentage of the single sheet (SST improvement percentage). However, when the cooling rate exceeded 100° C./s, the iron loss improvement percentage η of the wound iron core became lower than the iron loss improvement percentage of the single sheet, and the iron loss of the wound iron core deteriorated.

On the other hand, when the cooling rate of the grain-oriented electrical steel sheet was 75° C./s or less, the iron loss improvement percentage η of the wound iron core more reliably became higher than the iron loss improvement percentage of the single sheet, and the iron loss of the wound iron core was reduced. Therefore, the cooling rate of the grain-oriented electrical steel sheet is more preferably 75° C./s or less.

The cooling rate of the grain-oriented electrical steel sheet in the insulating coating re-formation step carried out after the formation of the laser grooves is preferably 20° C./s or more. This is because, when the cooling rate became less than 20° C./s, the manufacturability (cooling efficiency) of the grain-oriented electrical steel sheet degrades.

Figure 9:
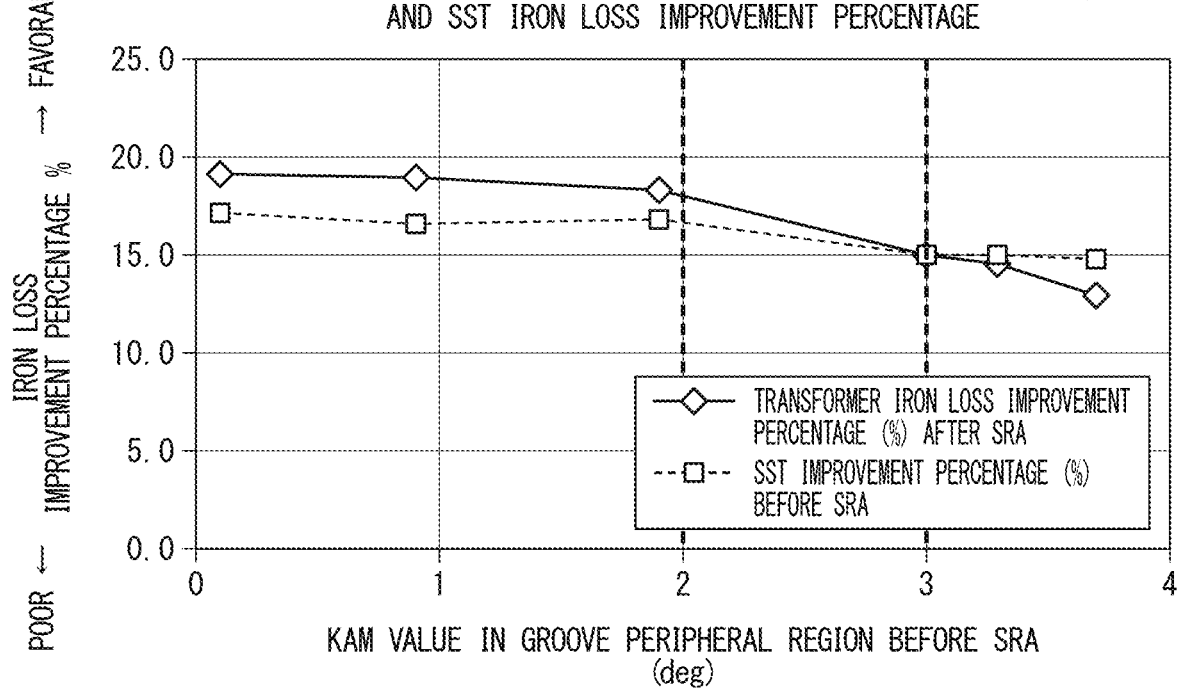
FIG. 9 is a graph showing a relationship among the KAM value in the groove peripheral region of the grain-oriented electrical steel sheet to be stress-relief-annealed, the iron loss improvement percentage of the stress-relief-annealed wound iron core, and the iron loss improvement percentage of the single sheet to be stress-relief-annealed (SST improvement percentage).

In addition, a graph showing the relationship between the KAM value in the groove peripheral region of the grain-oriented electrical steel sheet to be stress-relief-annealed and the iron loss improvement percentage of the stress-relief-annealed wound iron core is shown in FIG. 9. As is clear from FIG. 9, it can be confirmed that, when the KAM value in the groove peripheral region was 3.0 or less, the iron loss improvement percentage η of the wound iron core became higher than the iron loss improvement percentage of the single sheet (SST improvement percentage) and the iron loss was reduced.

Modification Example

Next, a modification example of the embodiment will be described.

A measurement method of the KAM value in the groove peripheral region of the grain-oriented electrical steel sheet can be appropriately changed. In addition, for example, the size of the pixel C (refer to FIG. 4) and the like at the time of mapping the groove peripheral region can be appropriately changed.

In addition, in the embodiment, the insulating coating agent application step and the flattening annealing step were carried out between the final annealing step and the laser groove formation step. However, the insulating coating agent application step and the flattening annealing step may be carried out after the laser groove formation step. That is, the final annealing step, the laser groove formation step, the heat treatment step, the insulating coating agent application step, and the flattening annealing step may also be carried out in this order. In this case, the insulating coating reformation step becomes unnecessary, and thus the number of the manufacturing steps of the grain-oriented electrical steel sheet is reduced.

Hitherto, an embodiment of the present invention has been described, but the present invention is not limited to this embodiment, one embodiment and a variety of modification examples may be used in appropriate combination, and it is needless to say that the present invention can be carried out in a variety of aspects within the scope of the gist of the present invention.

BRIEF DESCRIPTION OF THE REFERENCE SYMBOLS

10 GRAIN-ORIENTED ELECTRICAL STEEL SHEET
10A SURFACE (SURFACE OF GRAIN-ORIENTED ELECTRICAL STEEL SHEET)
12 GROOVE
12A GROOVE BOTTOM (GROOVE BOTTOM OF GROOVE)
14 SUBGRAIN BOUNDARY
16 GROOVE PERIPHERAL REGION (REGION)
20 WOUND IRON CORE
C, CA, CB PIXEL

What is claimed is:

1. A grain-oriented electrical steel sheet, in which a groove is formed on a surface thereof,
    wherein, in a cross section of the grain-oriented electrical steel sheet orthogonal to the groove, a KAM value in a region, which is on a central side in a thickness direction of the grain-oriented electrical steel sheet with respect to the groove and which is surrounded by a square of which one side is in contact with a groove bottom of the groove and a length in each side of which is 50 µm, is 0.1 or more and 3.0 or less.

2. The grain-oriented electrical steel sheet according to claim 1,
    wherein the groove is a laser groove.

3. The grain-oriented electrical steel sheet according to claim 1,
    wherein the KAM value is 0.1 or more and 2.0 or less.

4. The grain-oriented electrical steel sheet according to claim 2,
    wherein the KAM value is 0.1 or more and 2.0 or less.

* * * * *